SYSTEM FOR RESHAPING AND RETIMING A DIGITAL SIGNAL

Filed Sept. 18, 1963 2 Sheets-Sheet 1

INVENTOR.
KENNETH R. HACKETT
BY R. P. Campbell
ATTORNEY

SYSTEM FOR RESHAPING AND RETIMING A DIGITAL SIGNAL

Filed Sept. 18, 1963 2 Sheets-Sheet 2

INVENTOR.
KENNETH R. HACKETT
BY R. P. Campbell
ATTORNEY

United States Patent Office 3,270,288
Patented August 30, 1966

3,270,288

SYSTEM FOR RESHAPING AND RETIMING A DIGITAL SIGNAL

Kenneth R. Hackett, Boulder, Colo., assignor to Ball Brothers Research Corporation, Boulder, Colo., a corporation of Colorado Filed Sept. 18, 1963, Ser. No. 309,752
4 Claims. (Cl. 328—63)

Figure 2:
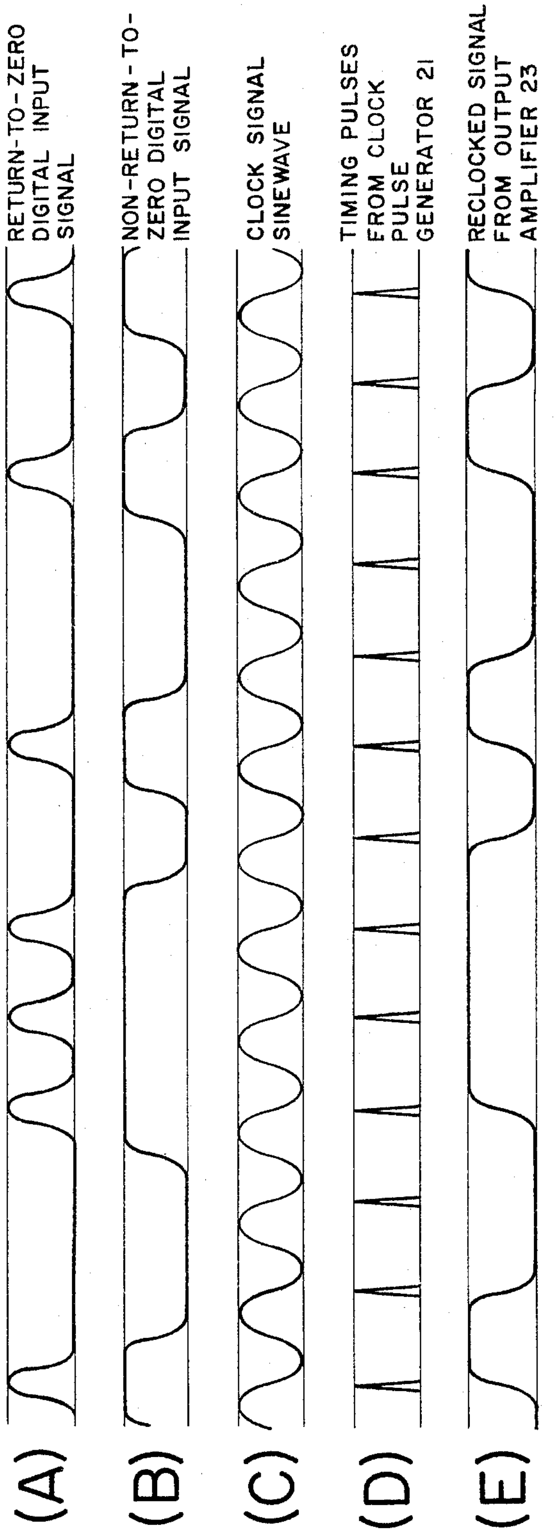

This invention relates to an electronic reclocking system and more particularly to such a system for reshaping and retiming a digital signal.

In the transmission and manipulation of signal information in the digital form, distortions, jitter, or stray frequency components are picked up and superimposed upon the signal. These disturbances must be removed from the signal before subsequent operations are performed thereon to avoid processing into the digital signal. As the bit rate of a digital signal is increased the prevalence and detrimental effects of these disturbances becomes more pronounced. Furthermore, during many of the electrical processes employed in a communication system, as well as during transmission of digital signals, the timing of the digital signals is distorted. Also, in communication systems it often is necessary to retime digital signals after their transmission so that they will have the same timing relation at a particular station as do the reference clock pulses generated for that station.

In the prior art, reclocking functions generally are performed by the use of very complicated circuitry and at substantially low bit rates. However, when the digital signals processed contain information corresponding to a video picture with audio signals, very high bit rates become necessary to accurately reproduce such information with sufficiently high resolution. The circuitry and reclocking methods generally used in the prior art are not adequate to accurately perform this function.

Accordingly, it is an important object of this invention to provide a system which is adequate for reclocking digital signals having a very high bit rate, such as those employed in video transmission.

It is another object of this invention to provide a reclocking system for retiming digital signals after their transmission so that they will be synchronized with clock pulses at a receiving station.

It is a further object of this invention to provide a system for retiming and reshaping digital signals having high bit rates with relatively simple reclocking circuitry.

Additional objects of the invention will become apparent from the following description, which is given primarily for purposes of illustration, and not limitation.

Stated in general terms, the objects of the invention are attained by providing a reclocking system which preferably includes input amplifier means for amplifying incoming digital signals, means for sampling each pulse from the incoming digital signals, gate means for gating incoming and sampled pulses into bistable circuit means at a particular instant, which circuit means holds the respective signals for a definite interval. The sampling and gating process is determined by timing pulses derived from a reference clocking signal. In a preferred embodiment, the timing pulses selectively trigger several logic gates according to the values of the discrete pulses of the incoming digital signals. Circuit means are included for adjusting the positions of the timing pulses so that sampling the transitions between pulses of the incoming digital signals is avoided. The elements of the system are so arranged that the outputs of the logic gates actuate the bistable circuit means to set it in one of its two stable states. The output of the bistable circuit means constitutes the retimed and reshaped digital signals to be processed by subsequent digital circuitry driven by the reference clocking signal.

As will be explained in more detail below, the reclocking system of the invention additionally provides a means for receiving a digital signal in the return-to-zero, or "RZ" form, or the non-return-to-zero, or "NRZ" form, and generating a reshaped and retimed digital signal in the NRZ form. The term "RZ" refers to the return-to-zero form of a digital signal in which the information is represented by a series of discrete short pulses or by the presence or absence of such pulses wherein the signal amplitude returns to zero between pulses. The term "NRZ" refers to the non-return-to-zero form of a digital signal in which the information is represented by two distinct levels or states, each one of which levels is sustained until a pulse of opposite value is received which sets the signal in its opposite level.

Figure 1:
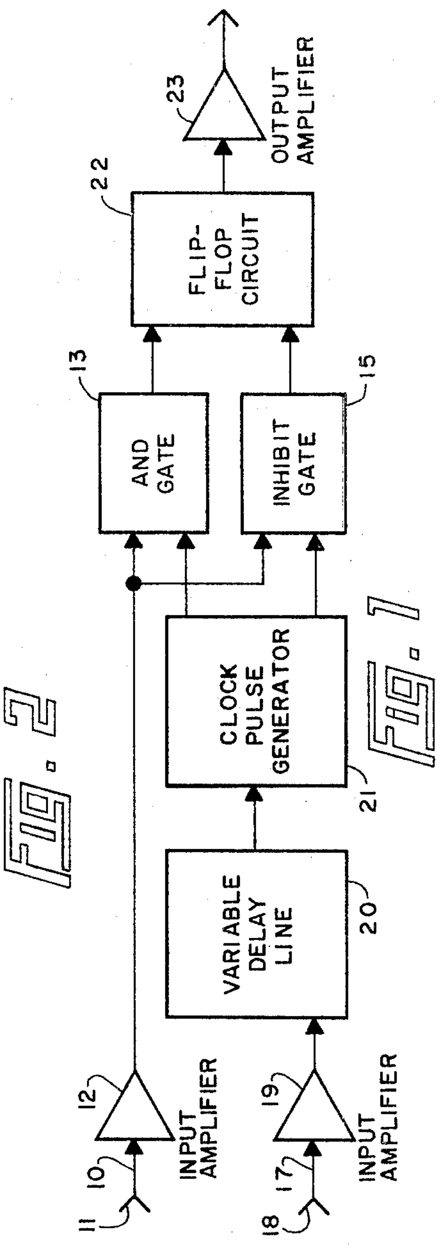
Figure 3:
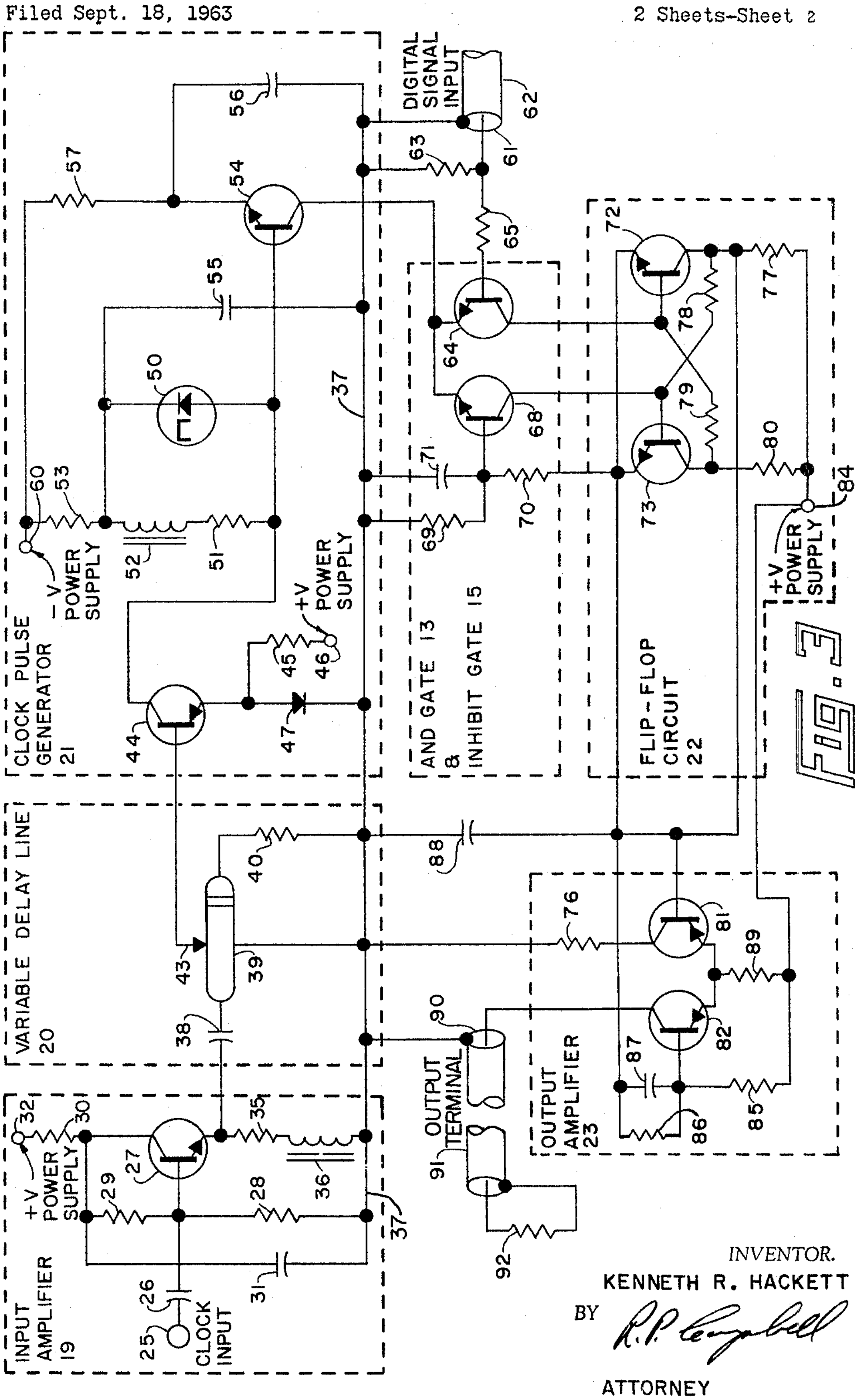

Other features and advantages of the invention will become apparent from the following detailed description given with reference to the appended drawings, wherein:

FIGURE 1 is a block diagram schematically showing a specific embodiment of a reclocking system of the present invention;

FIGURES 2(A) to (E) are waveform diagrams illustrating the operation of the reclocking system shown in FIGURE 1; and FIGURE 3 is a schematic circuit diagram showing wiring details of the reclocking system of FIGURE 1.

Referring to FIGURE 1, a digital signal 10 is fed to input 11 coupled to input amplifier 12. Digital signal 10 may be either in the RZ or the NRZ form.

With regard to the description of the pulse amplitudes or signal levels given hereinbelow, the term "zero value" means lower amplitude level or the "no pulse" condition, and the term "unit or one value" means greater amplitude or the "pulse" condition. This is conventional terminology employed with respect to digital signals in the binary form.

Input amplifier 12 functions partly as an isolation amplifier in that it prevents the passage of stray signals or frequency components back out through incoming line 11. Input amplifier 12 also serves to invert the pulses of incoming signal 10. The output of input amplifier 12 is fed in parallel into AND gate 13 and INHIBIT gate 15.

A clock signal 17, normally in the form of a sinewave, enters input amplifier 19 through input 18. Amplifier 19 acts as an isolation amplifier, preventing any stray signals or frequency components from returning along incoming line 18. Amplifier 19 also amplifies the power of clock signal 17 so that drain on the clock signal source (not shown) by the reclocker does not hinder the use of clock signal 17 by other circuits driven by the clock signal. The output of input amplifier 19 is fed to a variable delay line 20 coupled to a clock pulse generator 21.

Clock pulse generator 21 generates pulses from incoming clock signal 17. These pulses preferably are generated at the instant the clock sinewave crosses its zero axis in the negative direction. By using this zero axis crossing point of the sinewave as a reference, the reference point will not shift in time if the amplitude of clock signal 17 varies. This results in an output signal from clock pulse generator 21 which is very stable or insensitive to variations in the amplitude of clock signal 17. Output pulses from clock pulse generator 21 can be accurately positioned in time over a range of at least one clock interval by variable delay line 20.

The output signal from clock pulse generator 21 is fed in parallel into AND gate 13 and INHIBIT gate 15. The outputs of AND gate 13 and INHIBIT gate 15 are fed into flip-flop circuit 22. Flip-flop circuit 22 has two stable states, a unit or one state and a zero state. Flip-flop circuit 22 switches between the unit state and the zero state when it receives a pulse from AND gate 13 and INHIBIT gate 15, respectively. The output of flip-flop circuit 22 is fed to output amplifier 23 which amplifies the resulting retimed and reshaped signal for use by subsequent circuitry.

In operation, digital input signal 10, such as that illustrated by the RZ waveform diagram shown in FIGURE 2(A), or that illustrated by the NRZ waveform diagram shown in FIGURE 2(B), enters input 11 and is fed to input amplifier 12, where it is amplified and inverted. Thus, if a pulse has a unit or one value at input 11, it is fed to AND gate 13 and INHIBIT gate 15 as a zero value pulse. Since the output of clock pulse generator 21 consists of a series of one value pulses, such as those shown in FIGURE 2(D), upon the receipt of a one value pulse from clock pulse generator 21 at AND gate 13, and a zero value pulse from input amplifier 12 at AND gate 13, no pulse is passed. The zero value pulse fed to INHIBIT gate 15 from input amplifier 12 does not inhibit the passage of the one value pulse from clock pulse generator 21. Therefore, a pulse is passed by INHIBIT gate 15 and fed to flip-flop circuit 22. The pulse from INHIBIT gate 15 sets flip-flop circuit 22 into its zero state, so that when the signal is amplified and inverted by output amplifier 23, a one value pulse is emitted therefrom.

Conversely, when a pulse having a zero value enters input amplifier 12, it is amplified and inverted into a one value pulse which, when fed to AND gate 13 and to INHIBIT gate 15, prevents the passage of a pulse through INHIBIT gate 15. However, a pulse is passed through AND gate 13 in this case, and hence to flip-flop circuit 22, setting it in its one value state. In this case, the output signal, when amplified and inverted by output amplifier 23, appears as a zero value pulse.

It is evident, therefore, that the signal emitted from output amplifier 23 is a direct copy of digital signal 10; that is, the pulses representing unit or one values, and the pulses representing zero values, are the same, respectively, in each signal, as shown by the waveform diagram of FIGURE 2(E). However, the signal emitted from output amplifier 23, and shown in the waveform diagram of FIGURE 2(E), has been retimed to be in accord with reference clock signal 17, so that it can be processed by other digital circuitry driven by that clock signal. In addition, it should be noted that the output signal shown in FIGURE 2(E) is in the NRZ form, whereas the input signal 10 can be in either the RZ form, as shown in FIGURE 2(A), or in the NRZ form as shown in FIGURE 2(B).

The details of the circuitry of the reclocking system of FIGURE 1 are more clearly described with reference to FIGURE 3, in which groups of circuit elements constituting each of the blocks in FIGURE 1, have been enclosed in dotted lines and labeled. A clock signal in the form of a sinewave shown in FIGURE 2(C), enters clock input 25 and is fed to the base of emitter-follower transistor 27 through capacitor 26. Coupling capacitor 26 passes the clock signal and blocks the flow of any direct current. Resistors 28 and 29, connected to the output of capacitor 26, constitute a biasing network which sets transistor 27 to the proper operating point. Resistor 30 and capacitor 31 constitute a filter which prevents the clock signal from leaking into the +V power supply (not shown) connected to terminal 32. Resistor 35 and inductor 36 are connected to the emitter of transistor 27 and provide a direct current return to ground line 37.

Inductor 36 offers a high impedance to the clock frequency so that a negligible amount of clock signal energy is shunted to ground line 27, and therefore wasted. The amplified clock signal is coupled into the variable delay line unit 39 through capacitor 38. Variable delay line unit 39 terminates in its characteristic impedance resistor 40, connected to ground line 37. Delay line unit 39 is arranged so that it can delay the clock signal for a length of time up to at least one clock period. A sliding tap 43, which forms part of delay line unit 39, selects the desired phase of the clock signal, and couples it into the base of transistor 44.

Resistor 45 connects the emitter of transistor 44 to terminal 46, into which is fed a continuous direct current from the +V power supply. Diode 47 also is connected to resistor 45. When the base of transistor 44 is positive, current flowing through resistor 45 is diverted to ground line 37 through diode 47 and no current flows into transistor 44. When the base of transistor 44 is negative, current flowing through resistor 45 passes into transistor 44, and does not flow through diode 47 to ground 37. Thus, as the sinewave clock signal alternates between positive and negative, the current flowing through resistor 45 is alternately switched between diode 47 and transistor 44. This results in the generation of constant amplitude squarewave representing the current flowing in the collector of transistor 44, regardless of the magnitude of the sinewave clock signal impressed on the base of transistor 44.

This current squarewave alternately switches tunnel diode 50 between its high voltage state and its low voltage state at the sinewave clock rate. Resistor 51 provides a sufficient load so that tunnel diode 50 can return to the low state from the high state. Inductor 52 offers a high impedance in series with the load provided by resistor 51 during the switching time, and increases the switching speed. The average direct current flowing in the collector of transistor 44 flows through resistor 53, and serves to set the direct current operating point of transistor 54. High frequency components of the signal from tunnel diode 50 are shunted to ground line 37 through capacitor 55.

Tunnel diode 50 is switched to its high voltage state (positive extreme) at the instant the sinewave clock signal at the base of transistor 44 crosses the zero point in the negative direction. At the instant tunnel diode 50 switches to its high voltage state, some current is diverted to the base of transistor 54, which charges capacitor 56 to a potential more positive than it was prior to switching. While capacitor 56 is being charged, current flows to the emitter of transistor 54. When tunnel diode 50 switches back to its low voltage state, current ceases to flow in transistor 54 and capacitor 56 charges toward −V through resistor 57 connected to terminal 60, and thus to a −V power supply (not shown).

The result is the formation of a series of very narrow current pulses which flow in transistor 54. Capacitor 56 normally is very small so that it can be charged quickly, resulting in a narrow current pulse with proper amplitude so that sufficient current flows in transistor 54 when tunnel diode 50 switches.

A digital information signal, such as the one shown in FIGURE 2(A), or the one shown in FIGURE 2(B), enters the circuit at input terminal 61 through coaxial cable 62 terminated or connected to ground line 37 by resistor 63. The signal is coupled to the base of transistor 64 by resistor 65. The base of transistor 68 is biased by resistors 69 and 70 to a potential equal to one-half of the voltage extremes appearing at the base of transistor 64. Capacitor 71 shunts any high frequency components which may appear at the base of transistor 68 to ground line 37. The output signal comprising current pulses generated by transistor 54 flows to the common emitters of transistors 64 and 68 and then to the bases of transistors 72 and 73, which form part of flip-flop circuit 22 shown in FIGURE 1. Resistors 77, 78, 79 and 80 provide the biasing and cross coupling necessary for proper operation of flip-flop circuit 22.

Thus, if binary input 61 is such that it causes the base of transistor 64 to be more positive than the base of transistor 68, the current pulse from the collector of transistor 54 flows through transistor 64, and not through transistor 68. This triggers transistor 72 to the off condition thus causing the collector of transistor 73 to go negative. If the input signal has a value of zero voltage, transistor 68 conducts the current pulse from transistor 54, since the base of transistor 68 is more positive than the base of transistor 64. This switches transistor 73 off, and causes the collector of transistor 73 to go positive and the collector of transistor 72 to go negative.

The collector of transistor 72 is coupled to the base of transistor 81, which forms a part of the output amplifier 23 shown in FIGURE 1. Resistor 76 connects the collector of transistor 81 to ground line 37, and acts as a buffer. The base of transistor 82 is biased by resistors 85 and 86 to a potential between the two voltage extremes appearing at the collector of transistor 72. The high frequency components appearing at the base of transistor 82 are shunted to the ground line 37 by capacitors 87 and 88. The current flowing in resistor 89 is switched back and forth between transistor 81 and transistor 82, as the collector of transistor 72 is switched between its two voltage extremes by means of pulses from transistor 54 and pulses from the digital information signal fed to input 61.

When the input signal is positive, the collector of transistor 72, and therefore the base of transistor 81, goes positive causing transistor 82 to conduct. The collector of transistor 82 is directly connected to the output terminal 90 which feeds the reclocked digital output signal into coaxial cable 91, coupled to load resistor 92. When transistor 82 conducts, the output signal to terminal 90 is positive, which corresponds to the positive output. Similarly, when the input signal is negative, transistor 72 is switched to the negative direction causing transistor 81 to conduct the current flowing from terminal 84 out of a +V power supply through resistor 85, and no current flows in transistor 82. This results in a zero voltage output, which corresponds to the zero voltage input.

It has been shown that the reclocking system of the invention has several advantages over other types of reclockers and that it operates independently from any amplitude variations in the clock signal. Thus, by employing a sinewave for a timing signal instead of pulses, and by generating pulses when the sinewave clock signal crosses the zero axis in the negative direction, the application and the times at which pulses are generated are completely insensitive to any differences in amplitude of the clock signal. In digital systems where such a high priority must essentially be placed one timing, this advantage is important. This system also is more advantageous because high frequency sinewaves are more easily transferred around a digital system than are narrow pulses at high bit rates. As the pulses in the instant system are generated just prior to their use, they can be made very short without encountering many of the problems which arise when a pulse is distributed around a whole system.

Advantages also are obtained by using current pulses in the system of the invention instead of voltage pulses sometimes employed. When voltage pulses are used, it is necessary to charge up all the stray capacitances in the circuit. This requires a substantial time interval as well as a certain amount of power. The use of current pulses makes it possible to generate a very large amplitude pulse in an extremely short interval of time without charging problems or unnecessary power drain. The reclocking system of the invention has given very satisfactory operation over a wide range of frequencies, but it is particularly satisfactory for operation at extremely high bit rates, such as those encountered in the conversion of television signals into digital form.

From the above description of the invention, it will be apparent that various modifications in the method and apparatus described in detail herein may be made within the scope of the appended claims. Therefore, it is not intended to limit the invention to the specific details of the apparatus described hereinabove.

What I claim is:

1. A reclocking system comprising means for inverting an incoming digital signal, an AND gate and an INHIBIT gate each arranged to receive the inverted digital signal, a sinewave signal source, means for amplifying the sinewave signal of the sinewave signal source, a variable delay line connected to the amplifying means for changing the timing of the sinewave signal, a clock pulse generator connected to the output of the variable delay line for generating reference clock pulses having a period independent of the amplitude of the sinewave signal, means for supplying referencc clock pulses substantially simultaneously to the AND gate and the INHIBIT gate for selectively gating information pulses from the inverted digital signal through either the AND gate or the INHIBIT gate, a flip-flop circuit having two stable states connected to the outputs of the AND gate and of the INHIBIT gate and arranged for switching into either of its stable states by the gated information pulses, and means for inverting the output signal from the flip-flop circuit.

2. A reclocking system comprising an AND gate and an INHIBIT gate arranged to receive the digital signal, a sinewave signal source, a clock pulse generator adapted to generate clock pulses from the sinewave signal, means for supplying the clock pulses substantially simultaneously to the AND gate and the INHIBIT gate to sample and gate the pulses from the digital signal through either the AND gate or the INHIBIT gate in accordance with the binary value of the digital signal pulses, a variable delay line connected to the clock pulse generator for varying the position of the sinewave signal and the clock pulses in timed relation so that transitions between the digital signal pulses are not sampled, a bistable circuit connected to both the AND gate and the INHIBIT gate and adapted for selection of one of its stable states in accordance with the value of an input pulse of the bistable circuit, and means for emitting a digital signal from the bistable circuit containing the information from the incoming digital signal in timed relation with the clock pulses.

3. A reclocking system comprising an AND gate and an INHIBIT gate arranged to receive the digital signal, a sinewave signal source, a clock pulse generator adapted to generate clock pulses from a sinewave signal, means for supplying the clock pulses substantially simultaneously to the AND gate and the INHIBIT gate to sample and gate the pulses from the digital signal through either the AND gate or the INHIBIT gate in accordance with the binary value of the digital signal pulses, a variable delay line connected to the clock pulse generator for varying the position of the sinewave signal and the clock pulses in timed relation so that transitions between the digital signal pulses are not sampled, a flip-flop circuit connected to both the AND gate and the INHIBIT gate and adapted for selection of one of its stable states in accordance with the value of an input pulse of the flip-flop circuit, and means for emitting a digital signal from the flip-flop circuit containing the information from the incoming digital signal in timed relation with the clock pulses.

4. A circuit for timing and shaping a digital signal, comprising: an AND gate and an INHIBIT gate each arranged to receive an information carrying incoming digital signal; a signal source producing an output signal of predetermined frequency; a reference pulse generator connected to said signal source for generating reference pulses having a period independent of the amplitude of said output signal from said signal source; variable delay means connected to said reference pulse generator whereby said reference pulses may be timewise adjusted; means for coupling said reference pulses substantially simultaneously to said AND gate and said INHIBIT gate for producing an output signal from one of said gates to the exclusion of the other; a bistable circuit having one input connected to receive the output signal from said AND gate and the other input connected to receive the output signal from said inhibit gate whereby said bistable circuit is caused to produce an output when an output signal is received from one of said gates and is caused to produce no output when an output signal is received from the other said gate; and means for coupling a digital signal from said bistable circuit that carries the information of said incoming digital signal.

References Cited by the Examiner

UNITED STATES PATENTS

| | | | |
|---|---|---|---|
| 2,863,054 | 12/1958 | Dobbins | 328—92 |
| 2,885,662 | 5/1959 | Hansen | 328—151 X |
| 3,114,109 | 12/1963 | Melas | 328—63 |
| 3,131,355 | 4/1964 | Campanozzi et al. | 328—92 X |
| 3,145,309 | 8/1964 | Bothwell et al. | 307—88.5 |
| 3,145,342 | 8/1964 | Hill | 328—92 |

OTHER REFERENCES

Millman and Taub: "Pulse and Digital Circuits," 1956, pp. 401–414, McGraw-Hill.

ARTHUR GAUSS, *Primary Examiner.*

S. D. MILLER, *Assistant Examiner.*